(12) United States Patent
Pickles

(10) Patent No.: US 8,031,540 B2
(45) Date of Patent: *Oct. 4, 2011

(54) RANDOMIZING CURRENT CONSUMPTION IN MEMORY DEVICES

(75) Inventor: Stephen Charles Pickles, Cleghorn (GB)

(73) Assignee: Atmel Corporation, San Jose, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 12/491,843

(22) Filed: Jun. 25, 2009

(65) Prior Publication Data

US 2009/0257295 A1    Oct. 15, 2009

Related U.S. Application Data

(63) Continuation of application No. 11/533,908, filed on Sep. 21, 2006, now Pat. No. 7,554,865.

(51) Int. Cl.
G11C 7/00 (2006.01)

(52) U.S. Cl. ............... 365/194; 365/189.05; 365/205

(58) Field of Classification Search .................. 365/194, 365/189.05, 205
See application file for complete search history.

(56) References Cited

U.S. PATENT DOCUMENTS

| | | | |
|---|---|---|---|
| 3,570,006 A | 3/1971 | Hoff et al. | |
| 4,447,895 A | 5/1984 | Asano et al. | |
| 5,404,402 A | 4/1995 | Sprunk | |
| 5,991,519 A | 11/1999 | Benhammou et al. | |
| 6,032,248 A | 2/2000 | Curry et al. | |
| 6,061,449 A | 5/2000 | Candelore et al. | |
| 6,094,724 A | 7/2000 | Benhammou et al. | |
| 6,144,230 A | 11/2000 | Kim | |
| 6,278,783 B1 | 8/2001 | Kocher et al. | |
| 6,295,606 B1 | 9/2001 | Messerges et al. | |
| 6,298,442 B1 | 10/2001 | Kocher et al. | |
| 6,304,658 B1 | 10/2001 | Kocher et al. | |
| 6,327,661 B1 | 12/2001 | Kocher et al. | |

(Continued)

FOREIGN PATENT DOCUMENTS

CA    2333095    5/2005

(Continued)

OTHER PUBLICATIONS

Atmel "AT91SC Family High Performance Secure Cryptocontrollers" www.atmel.com/dyn/resources/prod-documents/doc_1593.pdf, Sep. 2005, 2 pages.

(Continued)

*Primary Examiner* — Huan Hoang
(74) *Attorney, Agent, or Firm* — Fish & Richardson P.C.

(57) ABSTRACT

In some implementations, a memory device includes a plurality of memory cells, each memory cell storing a plurality of data bits; an input/output interface that is configured to, in response to receiving a read signal and an address value that identifies a specific memory cell in the plurality of memory cells, output a plurality of data bits corresponding to the identified specific memory cell; and a delay controller that is configured to delay the outputting to the input/output interface of at least one of the plurality of data bits based on a randomly selected or pseudo-randomly selected delay value. The memory device can further include a delay block having a plurality delay paths having varying delays, and randomly selecting or pseudo-randomly selecting the delay value can include randomly selecting or pseudo-randomly selecting one of the plurality of delay paths through which to transmit a control signal.

16 Claims, 6 Drawing Sheets

U.S. PATENT DOCUMENTS

| | | | |
|---|---|---|---|
| 6,331,784 | B1 | 12/2001 | Mason et al. |
| 6,381,699 | B2 | 4/2002 | Kocher et al. |
| 6,404,217 | B1 | 6/2002 | Gordon |
| 6,493,260 | B2 | 12/2002 | Micheloni et al. |
| 6,510,518 | B1 | 1/2003 | Jaffe et al. |
| 6,539,092 | B1 | 3/2003 | Kocher |
| 6,654,884 | B2 | 11/2003 | Jaffe et al. |
| 6,695,214 | B1 | 2/2004 | Leydier et al. |
| 6,748,410 | B1 | 6/2004 | Gressel et al. |
| 6,873,706 | B1 | 3/2005 | Miyazaki et al. |
| 6,877,100 | B1 | 4/2005 | Nobunaga et al. |
| 7,554,865 | B2 * | 6/2009 | Pickles .................. 365/194 |
| 2002/0124178 | A1 | 9/2002 | Kocher et al. |
| 2003/0044003 | A1 | 3/2003 | Chari et al. |
| 2003/0091191 | A1 | 5/2003 | Watanabe et al. |
| 2003/0120938 | A1 | 6/2003 | Mullor |
| 2004/0162993 | A1 | 8/2004 | Teglia |
| 2005/0069138 | A1 | 3/2005 | De Jong |
| 2005/0144417 | A1 | 6/2005 | Sheriff et al. |
| 2005/0271202 | A1 | 12/2005 | Shu et al. |
| 2005/0273630 | A1 | 12/2005 | Shu et al. |
| 2005/0273631 | A1 | 12/2005 | Shu et al. |
| 2006/0045264 | A1 | 3/2006 | Kocher et al. |

FOREIGN PATENT DOCUMENTS

| | | |
|---|---|---|
| EP | 1674966 | 6/2006 |
| WO | WO 99/01815 | 1/1999 |
| WO | WO 01/55821 | 8/2001 |
| WO | WO 2004/112306 A2 | 12/2004 |

OTHER PUBLICATIONS

Atmel "Development Support AT90SC and AT91SC Families" www.atmel.com/dyn/resources/prod-documents/doc1599.pdf, Sep. 2005, 2 pages.

Atmel "Secure Microcontrollers for Smart Cards AT90SC9616RC" Rev. Jan. 2003, 4 pages.

Atmel "Security with Atmel—Hard to Crack" www.atmel.com/dyn/resources/prod-documsents/doc1596.pdf, Sep. 2005, 2 pages.

Atmel Secure Products, www.atmel.com/dyn/resources/prod-documents/doc.6523.pdf, 2005, 20 pages.

Atmel Security Applications "Limiting Illegal Hardware Copies by Using Secure Hardware Authentication" http://www.atmel.com/dyn/products/other-docs.asp?family_id=662, Updated Feb. 2005, pp. 24-26.

International Preliminary ESIDS Jan. 15, 2009amining Authority—PCT/US2007/075446, mailed Aug. 11, 2008, 6 pages.

International Search Report & Written Opinion PCT/US2007/078621, mailed Mar. 27, 2008, 11 pages.

International Search Report & Written Opinion PCT/US2007/075446, mailed Jan. 10, 2008, 12pages.

International Search Report & Written Opinion PCT/US2007/075646, mailed Jan. 1, 2008, 12 pages (0028WO1).

Kocher et al., "Differential Power Analysis," (http://www.cryptography.com/resources/whitepapaers/DPA.pdf),Technical Report, 1998, later published in Advances in Cryptology—*Crypto 99 Proceedings, Lecture Notes in Computer Science*, vol. 1666, M Wiener, ed., Springer-Verlag, 1999, 10 pages.

Li, Huiyun, "Security evaluation at design time for cryptographic hardware," Technical Report No. 665, University of Cambridge Computer Laboratory, Document UCAM-CL-TR-665/ISSN 1476-2986, Apr. 2006.

Nagravision "Technology Series—White Paper STB Security" www.nagravision.com/pdf/NV_TechServics_STBsecurity.pdf, 2005, 8 pages.

Schuster, Andreas, "Differential Power Analysis of an AES Implementation," Technical Report IAIK-TR 2004/06/25, 12 pages.

Tual, Jean-Pierre, "New Challenges in Smart Card Design," ASIDS Jan. 15, 2009alto presentation, MPSOC '05, Jul. 13, 2005.

USENISIDS Jan. 15, 2009 Technical Program—Paper—Smartcard 99 , Oliver Kömmerling, "Design Principles for Tamper-Resistant Smartcard Processors", http://www.useniSIDS1/15/09.org/publications/library/proceedings/smartcard99/full_papers/kommerling/kommerling_html/indeSIDS_1/15/09.html May 1999, 21 pages.

* cited by examiner

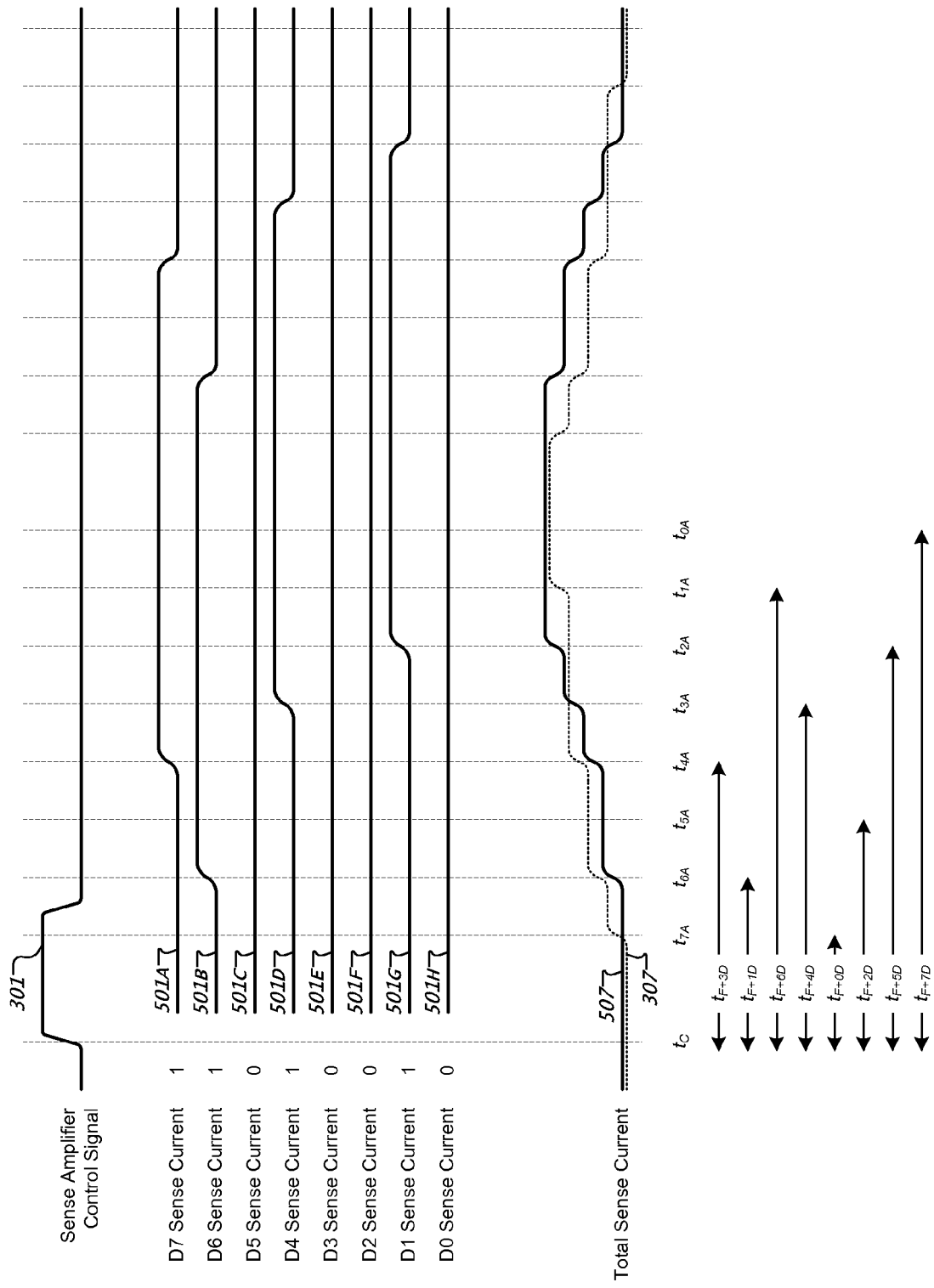

RANDOMIZING CURRENT CONSUMPTION IN MEMORY DEVICES

CROSS-REFERENCE TO RELATED APPLICATIONS

This application is a continuation application of U.S. patent application Ser. No. 11/533,908, filed on Sep. 21, 2006, now U.S. Pat. No. 7,554,865. The entire disclosure of U.S. patent application Ser. No. 11/533,908 is incorporated herein by reference.

TECHNICAL FIELD

The disclosed implementations relate to electrical circuits.

BACKGROUND

Storage devices may be employed in various secure applications to store protected data. For example, a semiconductor memory circuit may be used in a smart card, set-top box, Subscriber Identity Module (SIM) card or banking card to store user identification information, account information, device preference information or electronic payment authorization information.

Because of the potential value of protected data stored in a storage device, hackers may employ various invasive and noninvasive techniques to access or corrupt the protected data. For example, a hacker may grind off a portion of the storage device packaging in order to access internal signals and bypass security measures that may be in place. As another example, a hacker may subject the storage device to various kinds of radiation (e.g., laser light directed to exposed internal circuits or x-ray or gamma radiation directed through packaging) in an attempt to corrupt protected data. In some devices, corruption of protected data at certain locations in the device may cause the device to bypass security measures (e.g., encryption algorithms) or to yield information to the hacker regarding device architecture or the protected data itself.

A hacker may also employ non-invasive, or "side channel" attacks to discover functional details of a storage device. In particular, a hacker may observe various aspects of the device in operation, and apply statistical analysis to the observed aspects to deduce operational details of the device or to extract sensitive information (e.g., encryption or decryption keys). For example, the hacker may use differential power analysis (DPA) to analyze power consumption during device operations. Since the power consumption may be directly related to particular operations, the hacker may be able to deduce, for example, particular bits of a key used in a decryption algorithm, by observing many instances of a particular operation and applying statistical analysis to the observations. Similarly, a hacker may employ electromagnetic analysis (EMA) to monitor radiation output of a device during particular operations; statistical analysis of the radiation may also reveal sensitive information. A hacker may also analyze timing between variations in power consumption or electromagnetic radiation to identify times at which key operations of known algorithms (e.g., encryption or decryption algorithms) are performed.

Once a hacker has extracted sensitive information from a device, the hacker may use the sensitive information for various nefarious purposes. For example, the hacker may obtain pay-per-view or video-on-demand services using another user's account; the hacker may access telecommunication services that are billed to another user; the hacker may steal another user's bank account funds; the hacker may steal another's identity; etc.

SUMMARY

Countermeasures to attacks of secure devices can include minimizing the usefulness of "leaked" information. In particular, adding entropy or unpredictability to the leaked information can make it more difficult for hackers to extract sensitive information from the device. In some implementations, such entropy can be added by randomly or pseudo-randomly varying timing of current consumption during a read operation of a device.

In some implementations, a method includes receiving a read address value identifying a specific cell in a plurality of cells and receiving a read signal; and in response to the received read signal and the received read address value, providing each of a plurality of data bits stored in the identified specific cell to an interface. Providing each of the plurality of data bits can include providing a first data bit at a first time and providing a second data bit at a second time. The first time and the second time can be separated by at least a pseudo-randomly or randomly determined delay period.

The method can further include pseudo-randomly or randomly determining the delay period. Pseudo-randomly or randomly determining the delay period can include pseudo-randomly or randomly selecting the delay period from a plurality of possible delay periods. The method can further include applying the determined delay period to a control signal that is employed to provide a data bit in the plurality of data bits. In some implementations, the control signal is a sense amplifier control signal or a data latch control signal.

In some implementations, the plurality of cells are arranged in an array of rows and columns, and the method further includes decoding the read address value into a row address and a column address to identify a specific cell in the plurality of cells. Providing each of the data bits to the interface can include storing the plurality of data bits in an intermediate memory circuit associated with the interface. The intermediate memory circuit can be a latch. The method can further include pseudo-randomly determining or randomly determining a plurality of different delay periods, and providing, relative to the received read signal, each of the plurality of data bits to the interface after a different pseudo-randomly determined or randomly determined delay period.

In some implementations, a memory device includes a plurality of memory cells, each memory cell storing a plurality of data bits; an input/output interface that is configured to, in response to receiving a read signal and an address value that identifies a specific memory cell in the plurality of memory cells, output a plurality of data bits corresponding to the identified specific memory cell; and a delay controller that is configured to delay the outputting to the input/output interface of at least one of the plurality of data bits based on a randomly selected or pseudo-randomly selected delay value.

In some implementations, the delay controller is configured to delay the outputting to the input/output interface of at least one of the plurality of data bits based on at least one corresponding randomly selected or pseudo-randomly selected delay value. In some implementations, the delay controller is configured to delay the outputting to the input/output interface of each of the plurality of data bits based on corresponding randomly selected or pseudo-randomly selected delay values. The memory device can further include a delay block having a plurality of delay circuits from which the delay value is randomly selected or pseudo-randomly selected. The delay block can include a plurality of delay paths having varying delays, and randomly selecting or pseudo-randomly selecting the delay value can include randomly selecting or pseudo-randomly selecting one of the plurality of delay paths through which to transmit a control signal. The memory device can further include a pseudo-random or random delay selector that is configured to pseudo-randomly or randomly select the one delay path through which the control signal is transmitted.

In some implementations, a memory circuit includes a memory cell array that stores data in a plurality of memory cells; an interface configured to receive a read signal and a read address value; and a data buffer circuit comprising a plurality of sense amplifiers, a sense amplifier controller and a pseudo-random/random delay unit. The sense amplifier controller can be configured to provide, in response to a received read signal, a plurality of sense amplifier control signals to corresponding sense amplifiers in the plurality of sense amplifiers. Each sense amplifier can be configured to provide a corresponding data bit in a specific memory cell identified by a received read address value. The pseudo-random/random delay unit can be configured to add a pseudo-randomly or randomly selected delay value to at least one of the sense amplifier control signals.

In some implementations, the pseudo-random/random delay unit is configured to add at least one pseudo-randomly or randomly selected delay value to at least one corresponding sense amplifier control signal. The memory circuit can further include a plurality of delay paths having different lengths, and adding at least one pseudo-randomly or randomly selected delay value to at least one corresponding sense amplifier control signal can include transmitting the at least one sense amplifier control signal through at least one delay path in the plurality of delay paths. In some implementations, the pseudo-random/random delay unit is configured to add at least two different pseudo-randomly or randomly selected delay values to at least two corresponding sense amplifier control signals. The memory circuit can further include a plurality of delay paths having different lengths, and adding at least two pseudo-randomly or randomly selected delay values to at least two corresponding sense amplifier control signals can include transmitting the at least two sense amplifier control signals through at least two different delay paths in the plurality of delay paths. In some implementations, the pseudo-random/random delay unit is configured to add a different delay value to each of the sense amplifier control signals. The memory circuit can further include a plurality of delay paths having different lengths, and adding a different delay value to each of the sense amplifier control signals can include transmitting each of the sense amplifier control signals through a different one of the plurality of delay paths.

In some implementations, a system includes a memory circuit configured to store data; a processing circuit configured to process the data stored in the memory circuit to perform an operation, wherein the processing circuitry consumes electrical current in performing the operation; a delay circuit that is configured to randomly or pseudo-randomly delay performing at least a portion of the operation, such that a first current consumption signature associated with the processing circuit performing the operation at a first time has a statistical likelihood of being different than a second current consumption signature associated with the processing circuit performing the operation at a second time, wherein the statistical likelihood is substantially equal to, or exceeds, a predetermined threshold.

In some implementations, the predetermined threshold is substantially 87.5%. In some implementations, the predetermined threshold is substantially 99.9975%. The system can further include a smart card, and the delay circuit can be included in the smart card. In some implementations, the delay circuit includes a plurality of delay lines, and each delay line applies a different delay to a signal traveling on the delay line. Randomly or pseudo-randomly delaying performing at least one portion of the operation can include randomly or pseudo-randomly selecting one of the plurality of delay lines through which to route a control signal that initiates the at least one portion of the operation.

The details of one or more implementations are set forth in the accompanying drawings and the description below. Other features, objects, and advantages will be apparent from the description and drawings, and from the claims.

DESCRIPTION OF DRAWINGS

FIG. 5 shows exemplary relative timing and magnitude of current consumption associated with the sense amplifiers depicted in FIG. 3.

Like reference symbols in the various drawings indicate like elements.

DETAILED DESCRIPTION

Figure 1:
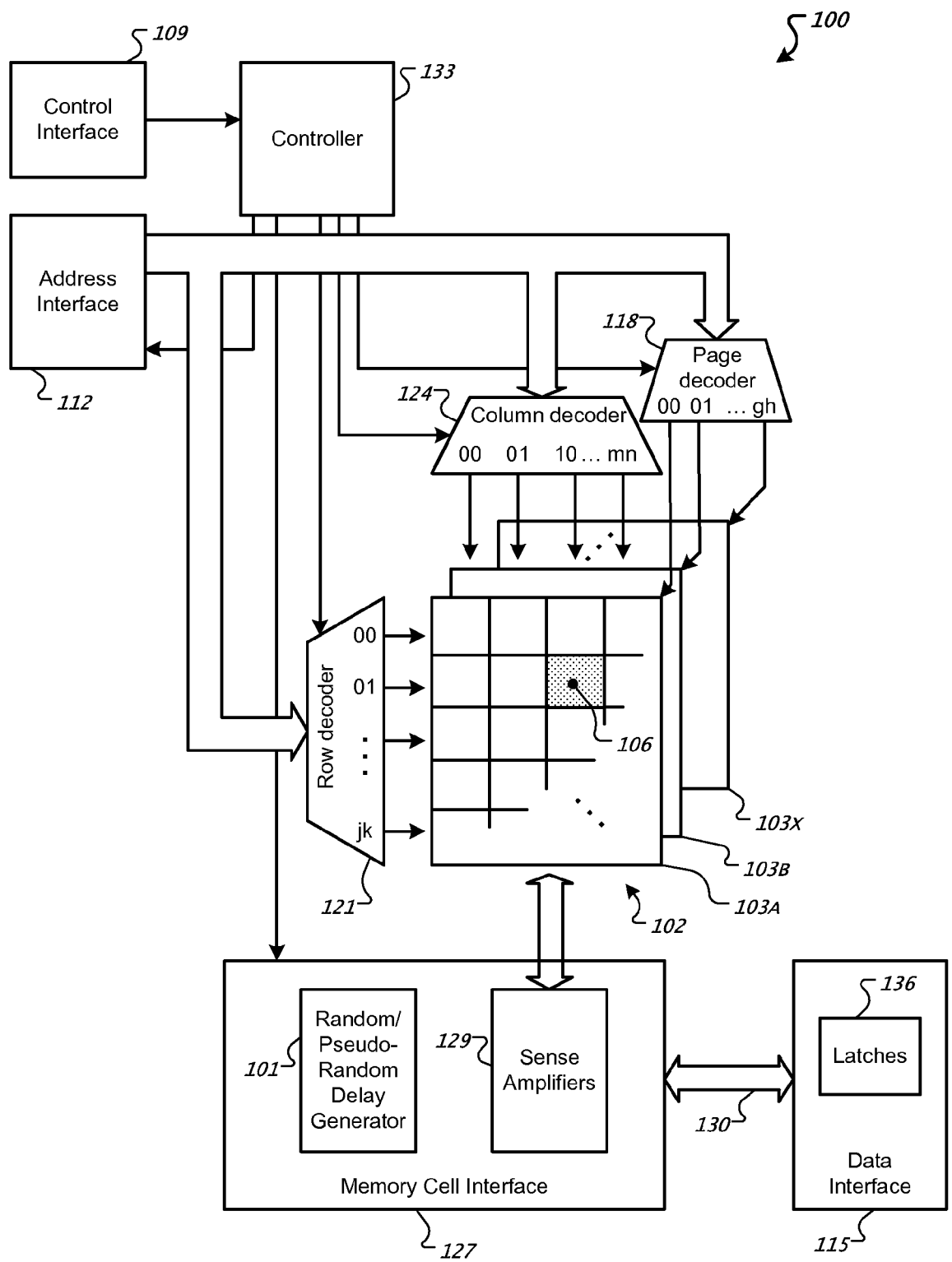
FIG. 1 is a block diagram of a data storage device having a random/pseudo-random delay generator that can randomize current consumption during a read operation.

FIG. 1 is a block diagram of a data storage device 100 (hereafter, "memory device 100") that includes a random/pseudo-random delay generator 101 that can randomize current consumption during operations (e.g., during a read operation), so as to minimize the usefulness of leaked information. The memory device 100 is generally configured to store data provided by an external circuit (e.g., in response to a write command; external circuit not shown) or provide data in response to an authorized request by the external circuit (e.g., in response to a read command). Because the data stored in or retrieved from the memory device 100 may be protected data used in a sensitive application (e.g., an application involving user identification information, financial or other account information, or payment authorization information), a hacker may attempt to access the protected data. As described in more detail below, the random/pseudo-random delay generator 101 can thwart some attempts by hackers to access the data.

In some implementations, data is stored in the memory device 100 in a memory cell array 102 that includes a number of "pages" 103A-103X, where each page is arranged as a matrix of data locations or "cells," and each data cell stores a unit of data having a fixed size (e.g., one byte, one word, etc.). As shown in the example configuration of FIG. 1, individual data cells within a page are addressable by a row address and a column address, and pages are addressable by a page address. For example, a data cell 106 is addressable with a page address of "00," a row address of "01" and a column address of "10." The memory pages 103A-103X shown in FIG. 1 are merely exemplary; an actual memory device may have more or less pages, rows or columns; or an actual memory device may have a non-paged architecture.

To store data in the memory device 100 or to retrieve data from the memory device 100, an external circuit (not shown) supplies an address and one or more control signals specifying whether data is to be stored in or retrieved from the memory device 100, or whether some other action is to be performed (e.g., memory is to be "refreshed" or erased or configured). Certain combinations of signals can be defined as "commands" to initiate particular operations (e.g., a read command, write command, refresh command, etc.). The external circuit interfaces with the memory device 100 through a control interface 109, an address interface 112 and a data interface 115. The external circuit can supply appropriate signals to the control interface 109 to specify, for example, a write command or a read command; the external circuit can supply an address to the address interface; and, in the case of a write operation, the external circuit can supply data to be written at the data interface 115.

The memory device 100 employs additional circuits to store or retrieve data in response to signals provided by the external circuit to the control interface 109, address interface 112 and data interface 115. For example, as shown, the memory device 100 includes a page decoder 118, row decoder 121 and column decoder 124. The decoders 118, 121 and 124 can decode a single address value received by the address interface 112 into page, row and column addresses that identify a specific data cell (or group of data cells, that correspond to, for example, an addressable byte or word of data). In some implementations, the page decoder 118, row decoder 121 and column decoder 124 simply split off particular bits of the received address value to obtain page, row and column addresses. For example, an address value of "000110" can be decoded as identifying the memory cell 106 having a page address of "00," a row address of "01" and a column address of "10." In other implementations, received address values are decoded in some other manner to create page, row and column addresses.

To store data in or retrieve data from a specific data cell having a decoded page address, row address and column address, the memory device 100 employs a memory cell interface 127. In one implementation as shown, the memory cell interface 127 includes sense amplifiers 129. Each column can have one or more sense amplifiers that boost signal values (e.g., charge values) associated with each bit in a data cell in the column whose row has been decoded. In some implementations, the column decoder 124 decodes one or more appropriate columns by turning on the sense amplifiers associated with the column or columns.

In some implementations, the sense amplifiers 129 draw a large amount of current, relative to other circuits that are employed in reading data. Accordingly, during a read operation, an increase in current consumption may be observable external to the memory device 100, and this increase in current consumption may be attributable to the switching on of the sense amplifiers 129. Moreover, depending on the architecture of the memory cell array 102 and the sense amplifiers 129, timing of read-related current consumption can vary based on which columns are decoded, or even which bit(s) within a column is/are decoded (e.g., in implementations in which one column is associated with 8, 16, or some other multiple number of bits). Moreover, in some implementations, current consumption varies based on an actual bit value amplified by a particular sense amplifier. For example, in some implementations, a sense amplifier consumes more current when it is amplifying a charge value associated with a logical '1' bit value than when the sense amplifier is amplifying a charge value associated with a logic '0.'

For the reasons outlined above, read operations of particular memory cells and/or read operations of particular bit values can result in different current-consumption "signatures." By repeatedly reading from known memory locations, or by repeatedly reading known data values while simultaneously monitoring current consumption (e.g., while performing a differential power analysis), a hacker may be able to identify particular current-consumption signatures and correlate the current-consumption signatures with particular memory cells or with particular data values.

As a countermeasure against possible attempts by hackers to identify and exploit particular current-consumption signatures, the memory device 100 includes a random/pseudo-random delay generator 101. The random/pseudo-random delay generator 101 can add entropy to the current consumption of elements in the memory device 100, including for example, the sense amplifiers 129. The added entropy can create different signatures for subsequent operations (e.g., reads of the same memory location or the same data value). A memory device, such as the memory device 100, that includes a circuit for adding entropy to current consumption can be more secure than devices that do not add entropy to current consumption.

The memory cell interface 127 can include other input/output gating circuitry (not shown) and write circuitry (not shown) for storing data in a memory cell. As shown, the memory device 100 includes a common data channel 130 that couples the memory cell interface 127 to the data interface 115. Data latches 136 within the data interface 115 can latch data values received from the memory cell interface 127. The memory device 100 also includes a controller 133 to manage overall operation of the memory device 100. In response to control signals received by the control interface 109, the controller 133 can cause the page decoder 118, row decoder 121 and column decoder 124 to appropriately decode an address value received by the address interface 112; and route data to or from the data interface 115, common data channel 130 and memory cell interface 127.

Figure 2:
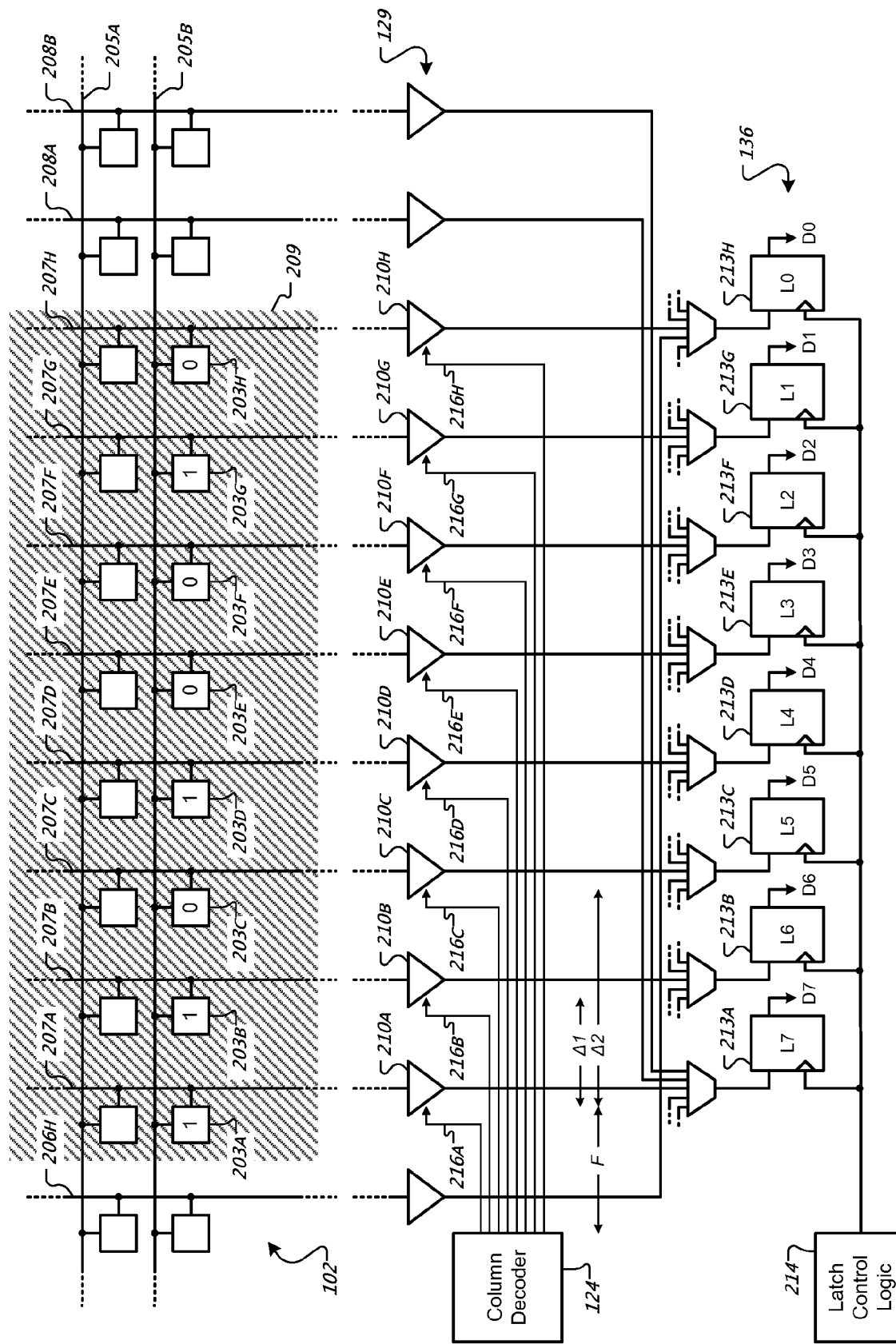
FIG. 2 is block diagram showing additional details of the data storage device shown in FIG. 1.

FIG. 2 is block diagram showing additional details of the memory cell array 102, sense amplifiers 129 and data latches 136 that are shown in FIG. 1. As shown in one implementation, the memory cell array 102 includes a number of individual memory cells (e.g., memory cells 203A-H) that are arranged in an array of wordlines (e.g., wordlines 205A and 205B) and bitlines (e.g., bitlines 206H, 207A-H, 208A and 208B). In some implementations, each memory cell stores a charge that represents a value (e.g., a logic '0' or '1' in a single-bit/cell architecture, or logic values "00," "01," "10" or "11" in a multi-bit/cell architecture, etc.). Memory cells in multiple bitlines can be grouped to form data units of varying sizes (e.g., 1 byte, 2 bytes, etc.), and in some implementations, all memory cells within a group are decoded together and associated with a single column. To decode a group of memory cells, an address can be decoded to obtain a row address (e.g., identifying a row 205B) and column address (e.g., a column address identifying bitlines 207A-H). As shown in FIG. 2, a column 209 includes eight bitlines (one byte of data); bitline 206H corresponds to another column, and bitlines 208A and 208B correspond to a third column.

Once a group of memory cells are decoded, their contents, (i.e., the charge stored in each cell in the group of memory cells) can be read by the sense amplifiers 129. In particular, the sense amplifiers 210A-H amplify the values stored in each decoded memory cell 203A-H, and in some implementations (not shown), compare the amplified value to a reference value to determine the logic value stored in the decoded memory cells 203A-H. Latches 213A-C can then latch the values provided by the sense amplifiers 210A-H, for example, in response to a control signal from latch control logic 214. In some implementations, other circuitry (not shown) refreshes the charge read from each memory cell, as this charge can be dissipated through the reading process.

As shown in FIG. 2, the sense amplifiers 210A-H are controlled by control signals 216A-H, which, in one implementation, are provided by the column decoder 124. For example, the sense amplifier 210A is controlled by the control signal 216A, the sense amplifier 210B is controlled by the control signal 216B, and so on. As shown in one implementation, each sense amplifier 210A-H receives its own control signal 216A-H. In other implementations, all sense amplifiers corresponding to a single column are controlled by a common control signal.

As described above, switching the sense amplifiers 210A-H on during a read operation can consume an appreciable amount of current relative to other aspects of a read operation. In some implementations, the magnitude of the current consumption can depend on the value the sense amplifier is reading. For example, a sense amplifier may consume more current when it is reading a logical '1' value than when it is reading a logical '0' value. Moreover, the timing of the current consumption associated with a particular sense amplifier can depend on the position of the sense amplifier relative to the source of the corresponding sense amplifier control signal.

In some implementations, the dependence of current consumption on position is caused by varying propagation delays of control signals provided by the column decoder 124 to the various sense amplifiers 210A-H. For example, as shown in FIG. 2, the control signal 216A provided by the column decoder 124 to the sense amplifier 210A travels a distance of the F and thus experiences a propagation delay of $t_F$. Another control signal 216B provided by the column decoder 124 to the sense amplifier 210B travels the distance F and an additional distance $\Delta 1$, and thus experiences a propagation delay of $t_{F+\Delta 1}$. A third control signal 216C provided by the column decoder 124 to the sense amplifier 210C travels the distance F and an additional distance $\Delta 2$, and thus experiences a propagation delay of $t_{F+\Delta 2}$.

Although the differences in propagation delays from one sense amplifier to the next may be very small, such differences can, in some implementations, be identifiable through, for example, statistical analysis of differential power measurements of many read operations. Moreover, propagation delay differences between sense amplifiers in different columns can be even larger and more identifiable than propagation delay differences between sense amplifiers in the same column. Differences in propagation delays, timing of current consumption and magnitude of current consumption are now further described with reference to FIG. 3.

Figure 3:
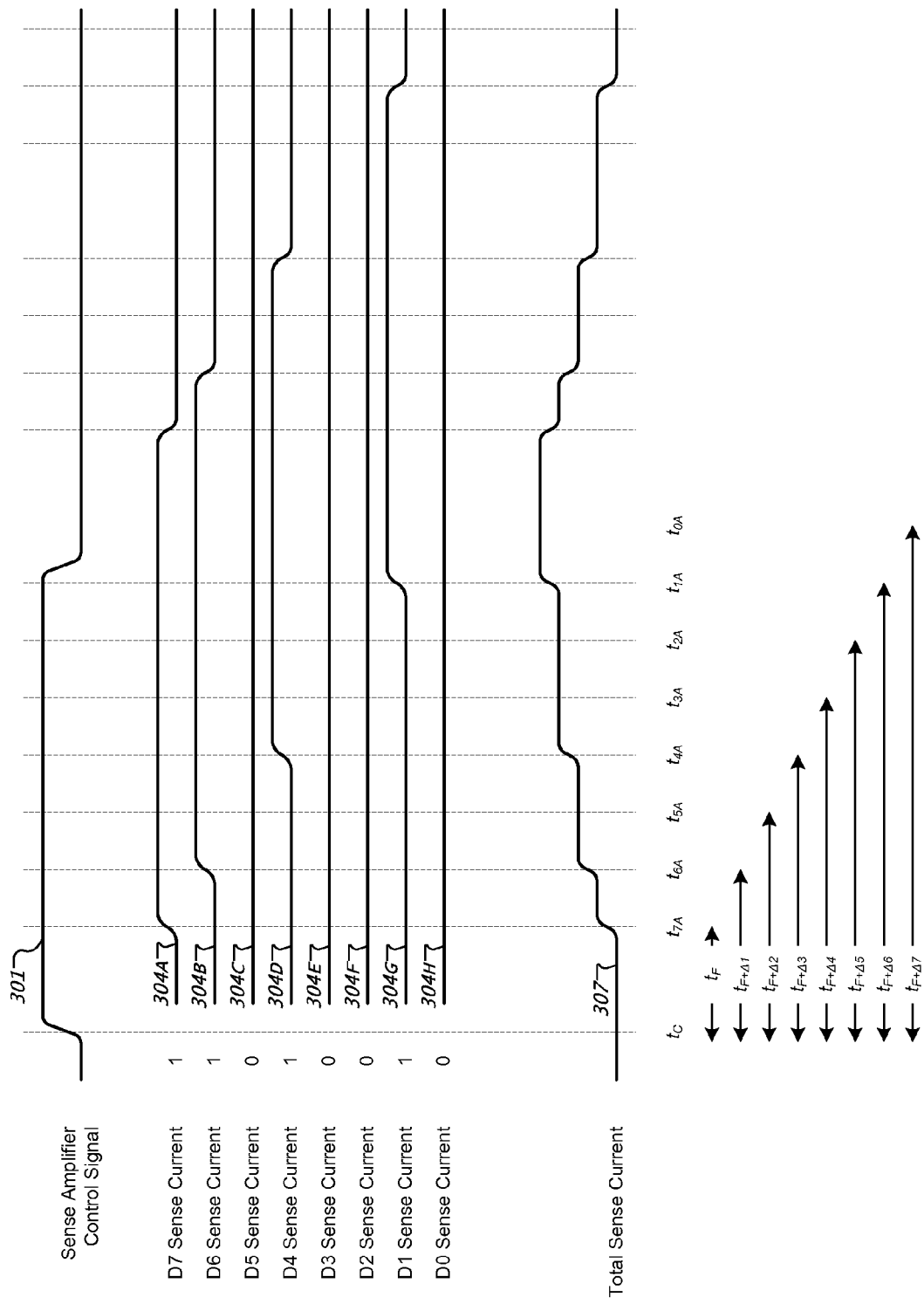
FIG. 3 shows exemplary relative timing and magnitude of current consumption associated with sense amplifiers that are shown in FIG. 2.

FIG. 3 shows exemplary relative timing and magnitude of current consumption associated with the sense amplifiers 210A-H that are shown in FIG. 2. As depicted in FIG. 3, a sense amplifier control signal 301 is asserted at time $t_C$. In FIG. 3, the sense amplifier control signal 301 represents the simultaneous assertion of control signals 216A-H by the column decoder 124 to each of the sense amplifiers 210A-H. Because of the difference in distance traveled by each control signal to the corresponding sense amplifier (e.g., signal 216A travels distance F, signal 216B travels distance F+$\Delta 1$, signal 216C travels distance F+$\Delta 2$, etc.), each corresponding sense amplifier 210A-H receives its control signal 216A-H at a slightly different time, even though in this example, each of the control signals 216A-H are asserted by the column decoder 124 at the same time (e.g., $t_C$). In particular, as depicted in FIG. 3, the control signal 216A arrives at the sense amplifier 210A at $t_{7A}$, after a propagation delay of $t_F$; the control signal 216B arrives at the sense amplifier 210B at $t_{6A}$, after a propagation delay of $t_{F+\Delta 1}$; the control signal 216C arrives at the sense amplifier 210C at $t_{5A}$, after a propagation delay of $t_{F+\Delta 2}$; etc.

In some implementations, once a control signal reaches its corresponding sense amplifier, the sense amplifier begins consuming an amount of current that is different than the amount of current the sense amplifier consumes in a quiescent (e.g., off) state. As shown in FIG. 3, the traces 304A-H correspond to example current consumption of sense amplifiers 210A-H. In the implementation shown, the amount of current consumed by each sense amplifier is different based on the data value the sense amplifier is reading. In particular, for example, the sense amplifiers 210A, 210B, 210D and 210G (associated with data bits D7, D6, D4 and D1, whose values are logic '1s') consume more current (depicted by traces 304A, 304B, 304D and 304G) when they are on than the sense amplifiers 210C, 210E, 210F and 210H (associated with date bits D5, D3, D2 and D0, whose values are logic '0s'; current consumption is depicted by traces 304C, 304E, 304F and 304H).

In aggregate, the total current consumed by the sense amplifiers 210A-H in this example is depicted by a current trace 307. As shown, the current trace 307 has a "signature," whose features (e.g., magnitude versus time features) are related to both the data value read and the bit position of the data value, as it related to the physical location of the corresponding sense amplifier relative to the sense amplifier control logic (e.g., the column decoder 124).

The current traces 304A-H and 307 are depicted smoothly with differences in magnitude and timing clearly shown for purposes of illustration. Current consumption of an actual device will typically include noise, and the current variation due to particular sense amplifiers switching on may only be apparent through differential power analysis. For purposes of example, current traces 304A-H depict greater current consumption when reading logical '1' values, but in some implementations, greater current is consumed by a sense amplifier when reading a logical '0' value, and in other implementations, current consumption is substantially equal regardless of the valued that is amplified by the sense amplifier. In some implementations, similar variations in magnitude and timing of current consumption can be detected between sense amplifiers associated with different columns in a similar manner as depicted in FIG. 3 between sense amplifiers associated with different bitlines in the same column. In some implementations, variations in magnitude and timing of current consumption can be correlated to currents through circuits other than sense amplifiers. For example, variations in magnitude and timing of current consumption can also result from activation of refresh circuits, precharge circuits, latch circuits, or other circuitry in the memory device 100.

Figure 4A:
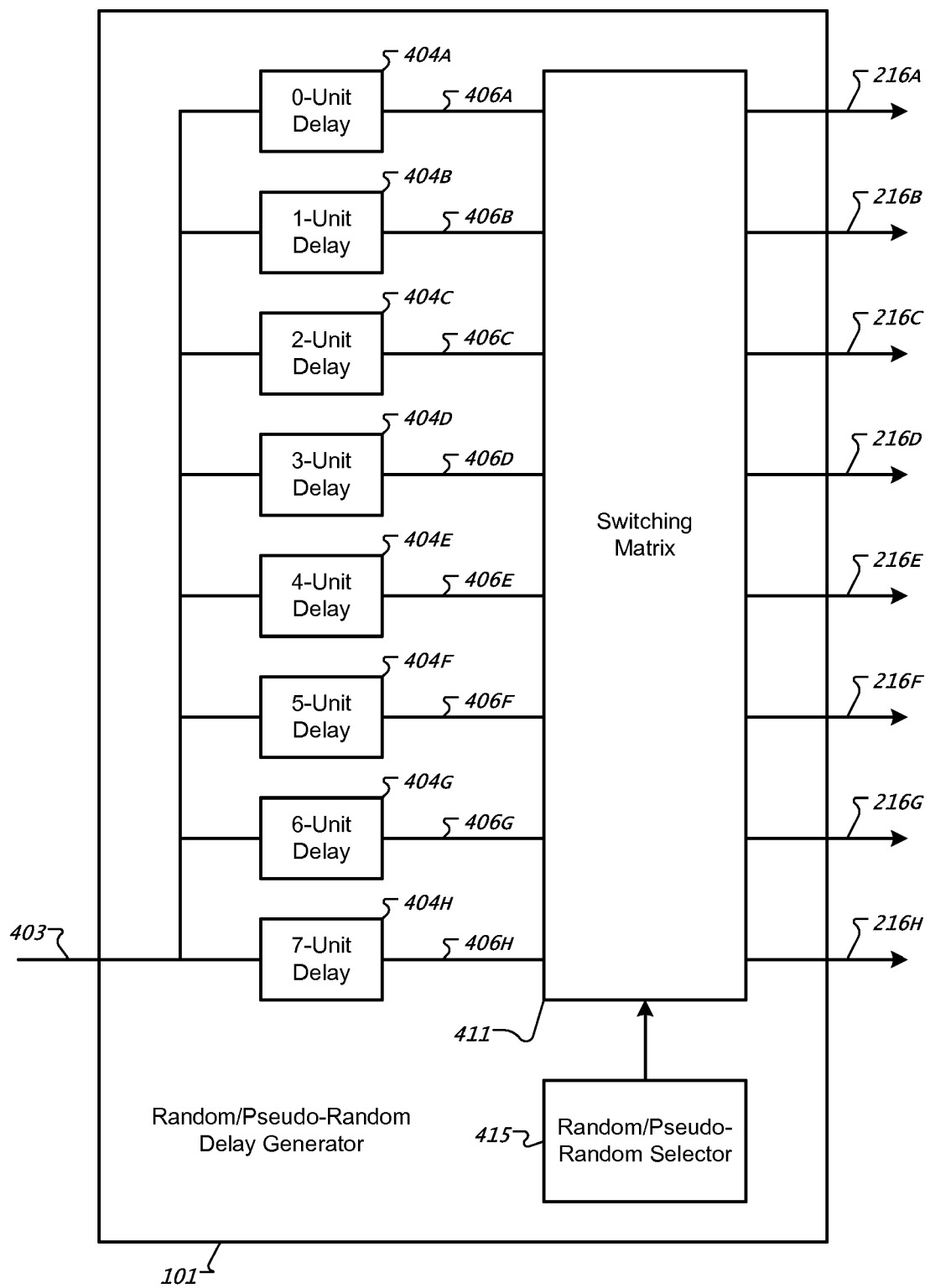
FIG. 4A is a block diagram showing additional details of the random/pseudo-random delay generator that is shown in FIG. 1.

FIG. 4A is a block diagram showing additional details of the random/pseudo-random delay generator 101 that is shown in FIG. 1. As shown in one implementation, the random/pseudo-random delay generator 101 receives as input a column select signal 403 and provides as output, bit-line select signals for each sense amplifier included in the column corresponding to the column select signal. For example, as shown, the random/pseudo-random delay generator 101 receives as input a column select signal 403 corresponding the column 209 that is shown in FIG. 2, and outputs the sense amplifier control signals 216A-H corresponding to the sense amplifiers 210A-H in the column 209. To generate each sense amplifier control signal 216A-H, the random/pseudo-random delay generator 101 applies a different delay to the column select signal 403. In one example, as shown, the column select signal 403 is routed to a number of delay circuits (e.g., delay lines) 404A-H that each add a different propagation delay to the column select signal 403. Delayed versions 406A-H of the column select signal 403 are then randomly or pseudo-randomly provided as the sense amplifier control signals 216A-H by a switching matrix 411 and a random/pseudo-random selector 415. Additional exemplary details of the switching matrix 411 are now provided with reference to FIG. 4B.

Figure 4B:
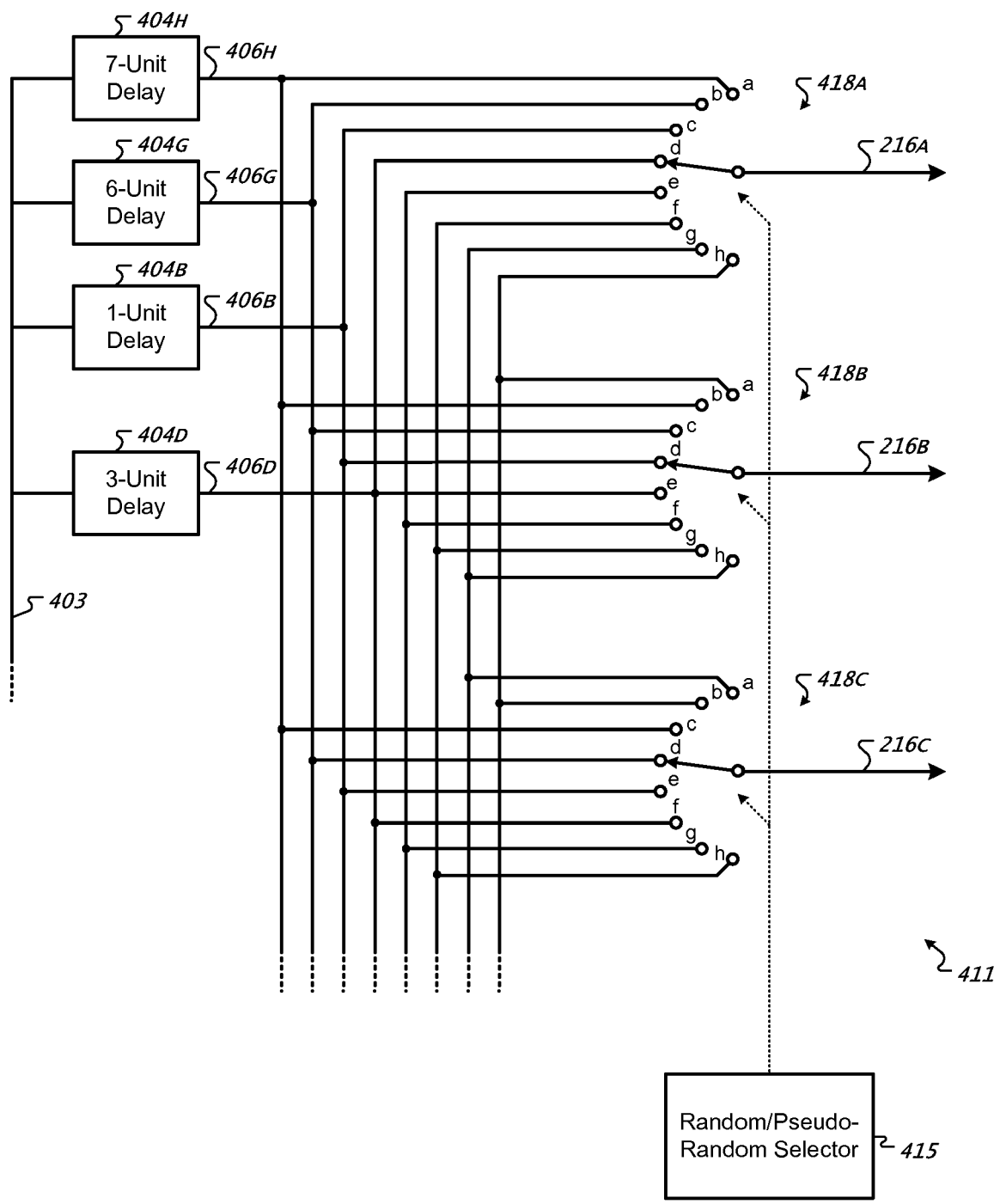
FIG. 4B shows additional details of the switching matrix that is shown in FIG. 4A.

FIG. 4B shows additional details of the switching matrix 411 that randomly or pseudo-randomly applies a delay to the column select signal 403 to generate the sense amplifier control signals 216A-H. In the implementation shown, the switching matrix 411 includes a number of switching elements 418A, 418B and 418C that are configured to provide each sense amplifier control signal 216A-H from one of the delayed versions 406A-H of the column select signal 403. As shown, the switching elements 418A, 418B and 418C are each 8-pole switches having positions 'a' to 'h.' The switching elements 418A, 418B and 418C all move substantially together, and their positions are controlled by a random/pseudo-random selector 415. For example, as shown, each the switching element is in its 'd' position, causing the sense amplifier control signal 216A to be provided by the delayed version 406D (3-unit delay), the sense amplifier 216B to be provided by the delayed version 406B (1-unit delay), and the sense amplifier 216C to be provided by the delayed version 406G (6-unit delay). If the switching elements 418A, 418B and 418C were each in the 'c' position, then the sense amplifier control signal 216A would be provided by the delayed version 406B (1-unit delay), the sense amplifier control signal 216B would be provided by the delayed version 406G (6-unit delay), and the sense amplifier control signal 216C would be provided by the delayed version 406H (7-unit delay). In some implementations, the random/pseudo-random selector 415 randomly or pseudo-randomly selects the position of the switching elements 418A, 418B and 418C to randomly or pseudo-randomly provide a delay for each sense amplifier control signal 216A-H.

Only a portion of the switching matrix 411 is shown in FIG. 4B, but the reader will readily appreciate how the remainder of the switching matrix 411 would be connected. Moreover, although the switching matrix 411 is described in the context of providing eight random or pseudo-randomly delayed versions of a column select signal 403, the principles described herein can readily be extended to provide a switching matrix that is capable of providing any number of sense amplifier control signals, each one having one of any number of delay values applied thereto. Furthermore, the switching elements 418A-C are described and illustrated conceptually as multi-pole switches, but the switching elements 418A-C can be physically implemented in many ways (e.g., as digital or analog demultiplexers, individual transistor switches, etc.).

In some implementations, the total delay of each control signal will be substantially independent of the physical architecture of the memory device 100, and the usefulness of any leaked information related to current consumption of individual sense amplifiers may be greatly diminished. That is, the "signature" associated with a read of any particular memory location or any particular data value is likely to be different each time that particular memory location or data value is read, minimizing the chance that a hacker will be able to glean information about specific memory locations or data values based on variations in timing or magnitude of current consumption in corresponding sense amplifiers. An example alternative read signature is now described with reference to FIG. 5.

FIG. 5 shows exemplary relative timing and magnitude of current consumption associated with the sense amplifiers 210A-H that are depicted in FIG. 3. As shown in FIG. 5, the same data values are read by each sense amplifier as are read in FIG. 3, but each of the corresponding control signals 216A-H to the sense amplifiers 210A-H are randomly or pseudo-randomly delayed by the random/pseudo-random delay generator 101 that is illustrated in and described with reference to FIGS. 4A and 4B. That is, instead of each sense amplifier control signal 216A-H solely experiencing a propagation delay that is related to the distance the control signal 216A-H travels from the column decoder 124 to the corresponding sense amplifier 210A-H (e.g., $t_F$, $t_{F+\Delta 1}$, $t_{F+\Delta 2}$, etc.), each control signal is actively delayed by the random/pseudo-random delay generator 101. Although reference is made in this example to each control signal being actively delayed by the delay generator 101, it is possible for only a subset of the control signals provided to the sense amplifiers to be delayed by the delay generator 101. In the example shown in FIG. 5, the control signal 216A is actively delayed by a time $t_{F+3D}$ (e.g., a fixed amount plus a 3-unit delay from the 3-delay element 404D), and thus the corresponding current consumption, depicted by current trace 501A, is delayed by a similar amount of time ($t_{F+3D}$). Similarly, the control signal 216B is actively delayed by a time $t_{F+1D}$ (e.g., a fixed amount plus a 1-unit delay from the 1-delay element 404B), and thus the corresponding current consumption, depicted by current trace 501B, is delayed by a similar amount of time ($t_{F+3D}$). Other active delay values are depicted by the current traces 501C-H.

In aggregate, the total current consumed by the sense amplifier 210A-H in this example is depicted by a current trace 507. For comparison, a copy of the current trance 307 from FIG. 3 is provided in FIG. 5 as a dashed line. As shown, even though the data values read in the examples in FIG. 3 and FIG. 5 are the same, the read signatures are different. Moreover, if the same data were to be read again, the read signature would be likely different than either the signature depicted by the current trace 307 or the current trace 507, in implementations that randomly or pseudo-randomly delay the sense amplifier control signals 216A-H each time a read operation is performed.

Because the success of differential power analysis typically depends on minute differences in power consumption between operations that are consistently repeatable enough to generate a large data set that can be statistically analyzed, even small random or pseudo-random variations in power consumption that are applied to otherwise repeatable operations can thwart hackers' attempts to study the operations with, for example, differential power analysis. Accordingly, devices that employ the methods, systems and techniques describes herein can be substantially more secure than devices that do not employ these methods, systems and techniques. Moreover, even greater random or pseudo-random variation can be added to the timing and magnitude of current consumption than that depicted in FIG. 5. For example, randomly or pseudo-randomly selected delays can be substantially longer than propagation delays of the sense amplifier control signals 216A-H. Accordingly, the current trace 507 can be horizontally expanded relative to the current trace 307, and in some implementations, this horizontal expansion of the current trace 507 further blurs any correlation between current consumption at particular times to particular sense amplifiers 210A-H.

A number of implementations have been described. Nevertheless, it will be understood that various modifications may be made without departing from the spirit and scope of the disclosed implementations. For example, although many of the disclosed implementations include sense amplifier signals that are randomly or pseudo-randomly delayed, latch control signals or other control signals that are employed in reading data could be randomly or pseudo-randomly delayed in place of or in addition to the sense amplifier control signals. The memory device in which control signals are randomly or pseudo-randomly delayed can be any kind of memory device, including, for example, volatile and non-volatile memory devices, paged and non-paged devices, random-access or read-only devices and devices based on DRAM, SRAM, EEPROM, or Flash technology. The memory device can be included in a device such as a smart card, and the random or pseudo-random delay of control signals can increase overall security of the smart card. Random or pseudo-random delay of control signals can be applied to other devices and circuits, in addition to memory devices. For example, one or more control signals for controlling processing circuitry that performs an operation within, e.g., a smart card, can be randomly or pseudo-randomly delayed each time the operation is performed, such that the likelihood that current signatures associated with performance of the same operation by the processing circuitry at two different times is equal to, or exceeds, a predetermined threshold. The predetermined threshold can vary based on how many variations in delay are possible, and how many control signals to which a random or pseudo-randomly selected delay is applied. For example, in some implementations, a control signal to which a delay value is randomly or pseudo-randomly applied, where the delay value is one value selected from eight possible values, can have a likelihood of being different substantially equal to $1\frac{7}{8}$—or 87.5% of the time. Accordingly, to the extent that a corresponding current consumption is different for each different delay value, the current consumption signatures associated with the same operation performed at two different times in response to the randomly or pseudo-randomly delayed control signal can have a likelihood of being different substantially 87.5% of the time. As another example, in some implementations, a different delay, selected from eight possible delay values, is randomly or pseudo-randomly applied to eight different control signals, without repetition, resulting in a likelihood of substantially $1\frac{1}{8}!$ (or about 99.9975% of the time) that a variation in timing of the eight control signals will exist between any two times the control signals are delayed. Accordingly, other implementations are within the scope of the following claims.

What is claimed is:

1. A method comprising:
   determining one or more delay periods;
   pseudo-randomly selecting a first delay period;
   obtaining a selection of a current sensing device from a group of one or more current sensing devices; and
   applying a control signal to activate the selected current sensing device after the first delay period, in response to receiving a read signal.

2. The method of claim 1, where the current sensing device is selected pseudo-randomly.

3. The method of claim 2, where the current sensing device is selected pseudo-randomly based on positions of the one or more current sensing devices relative to a source of the control signal.

4. The method of claim 1, where the group of one or more current sensing devices are associated with a single column of memory cells in a memory array.

5. The method of claim 1, where the group of one or more current sensing devices are associated with two or more columns of memory cells in a memory array.

6. A method comprising:
   receiving a read address value identifying a specific cell in a plurality of cells and receiving a read signal; and
   providing data bits associated with the specific cell to an interface including providing one or more data bits at a first time and providing one or more data bits at a second time, where the first time and the second time are separated by at least a pseudo-randomly determined delay period.

7. A device comprising:
   a delay generator that determines one or more delay periods and pseudo-randomly selects a first delay period;
   an interface that obtains a selection of a current sensing device from a group of one or more current sensing devices; and
   a controller that applies a control signal to activate the selected current sensing device after the first delay period, in response to receiving a read signal.

8. The device of claim 7, where the current sensing device is selected pseudo-randomly.

9. The device of claim 8, where the current sensing device is selected pseudo-randomly based on positions of the one or more current sensing devices relative to the controller.

10. The device of claim 7, where the group of one or more current sensing devices are associated with a single column of memory cells in a memory array.

11. The device of claim 7, where the group of one or more current sensing devices are associated with two or more columns of memory cells in a memory array.

12. A system comprising:
    memory cells;
    one or more sensing devices configured to read contents of selected ones of the memory cells;
    a delay generator that determines one or more delay periods and pseudo-randomly selects a first delay period; and
    a controller that applies a control signal to activate a first sensing device associated with a selected memory cell after the first delay period, in response to receiving a read signal.

13. The system of claim 12, where the first sensing device is selected pseudo-randomly.

14. The system of claim 13, where the first sensing device is selected pseudo-randomly based on positions of the one or more sensing devices relative to the controller.

15. The system of claim 12, where the memory cells are configured in an array, and the one or more sensing devices are associated with a single column of memory cells.

16. The system of claim 12, where the memory cells are configured in an array, and the one or more sensing devices are associated with two or more columns of memory cells.

* * * * *

UNITED STATES PATENT AND TRADEMARK OFFICE
CERTIFICATE OF CORRECTION

| | | |
|---|---|---|
| PATENT NO. | : 8,031,540 B2 | Page 1 of 1 |
| APPLICATION NO. | : 12/491843 | |
| DATED | : October 4, 2011 | |
| INVENTOR(S) | : Stephen Charles Pickles | |

It is certified that error appears in the above-identified patent and that said Letters Patent is hereby corrected as shown below:

Title Page 1, column 2, item (57) Abstract, line 12, after "plurality" insert --of--.

Title Page 2, column 2, item (56) Other Publications, line 2, delete "docusments" and insert --documents--.

Title Page 2, column 2, item (56) Other Publications, line 9, delete "2009amining" and insert --2009 mining--.

Title Page 2, column 2, item (56) Other Publications, line 18, delete "whitepaers" and insert --whitepapers--.

Title Page 2, column 2, item (56) Other Publications, line 27, delete "TechServics" and insert --TechServices--.

Title Page 2, column 2, item (56) Other Publications, line 32, delete "2009alto" and insert --2009 alto--.

Title Page 2, column 2, item (56) Other Publications, line 34, delete "99 ," and insert --99,--.

Column 4, line 23, after "is" insert --a--.

Column 10, line 39, delete "trance" and insert --trace--.

Column 11, line 37, delete "1⅛" and insert --1-1/8--.

Column 11, line 48, delete "1⅛" and insert --1-1/8--.

Signed and Sealed this
Twenty-ninth Day of November, 2011

David J. Kappos
*Director of the United States Patent and Trademark Office*